(12) United States Patent
Zampetti

(10) Patent No.: US 9,264,132 B2
(45) Date of Patent: Feb. 16, 2016

(54) UNIVERSAL ASYMMETRY COMPENSATION FOR PACKET TIMING PROTOCOLS

(71) Applicant: Microsemi Corporation, San Jose, CA (US)

(72) Inventor: George P. Zampetti, Livermore, CA (US)

(73) Assignee: Microsemi Frequency and Time Corporation, San Jose, CA (US)

(*) Notice: Subject to any disclaimer, the term of this patent is extended or adjusted under 35 U.S.C. 154(b) by 96 days.

(21) Appl. No.: 14/149,370

(22) Filed: Jan. 7, 2014

(65) Prior Publication Data

US 2014/0192826 A1 Jul. 10, 2014

Related U.S. Application Data

(60) Provisional application No. 61/749,565, filed on Jan. 7, 2013.

(51) Int. Cl.
*H04L 12/66* (2006.01)
*H04B 10/07* (2013.01)
*H04J 3/06* (2006.01)

(52) U.S. Cl.
CPC .............. *H04B 10/07* (2013.01); *H04J 3/0644* (2013.01); *H04J 3/0658* (2013.01); *H04J 3/0667* (2013.01)

(58) Field of Classification Search
USPC ......................................... 370/252, 503, 350
See application file for complete search history.

(56) References Cited

U.S. PATENT DOCUMENTS

| 8,064,484 | B2 | 11/2011 | Zampetti |
| 8,385,212 | B2 | 2/2013 | Zampetti et al. |
| 8,427,963 | B2 | 4/2013 | Zampetti et al. |
| 8,462,821 | B1 * | 6/2013 | Sagarwala et al. ............ 370/508 |
| 8,594,134 | B2 | 11/2013 | Zampetti et al. |
| 8,600,239 | B2 | 12/2013 | Mani |
| 2005/0207387 | A1 | 9/2005 | Middleton et al. |

(Continued)

FOREIGN PATENT DOCUMENTS

WO 2012048975 A1 4/2012

OTHER PUBLICATIONS

Written Opinion of the International Searching Authority for PCT Application No. PCT/US2014/010474 dated Apr. 24, 2014.

(Continued)

*Primary Examiner* — Duc C Ho
(74) *Attorney, Agent, or Firm* — Patterson & Sheridan, LLP

(57) ABSTRACT

The notion of a "PTP aware" path is one current proposed approach to reduce asymmetry effects. In a fully PTP aware path there is the notion of on-path support mechanisms such as boundary clocks and transparent clocks at every switching or routing node. However, on-path support methods only address time-transfer errors introduced inside network elements and any asymmetry in the transmission medium, such as, for example, the fiber strands for the two directions of transmission, cannot be compensated for by on-path support mechanisms. Furthermore, in a real operational network, which may traverse different operational domains administered by different entities, full on-path support is a difficult challenge. In certain managed network scenarios full on-path support can be contemplated. Nevertheless, the universal asymmetry compensation method described herein mitigates the asymmetry in a network path, without requiring on-path support mechanisms such as transparent clocks and boundary clocks.

20 Claims, 5 Drawing Sheets

(56) References Cited

U.S. PATENT DOCUMENTS

| | | |
|---|---|---|
| 2007/0147562 A1* | 6/2007 | Eidson .......................... 375/354 |
| 2007/0223537 A1 | 9/2007 | Crowle et al. |
| 2012/0275501 A1 | 11/2012 | Rotenstein |
| 2012/0320794 A1 | 12/2012 | Belhadj et al. |
| 2013/0077964 A1* | 3/2013 | Mani .............................. 398/34 |
| 2013/0202291 A1* | 8/2013 | Cavaliere et al. ............... 398/33 |

OTHER PUBLICATIONS

International Search Report for PCT Application No. PCT/US2014/010474 dated Apr. 24, 2014.

* cited by examiner

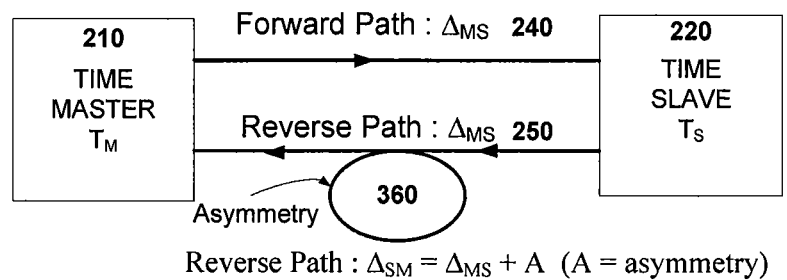
Figure 3. Asymmetry
Prior Art
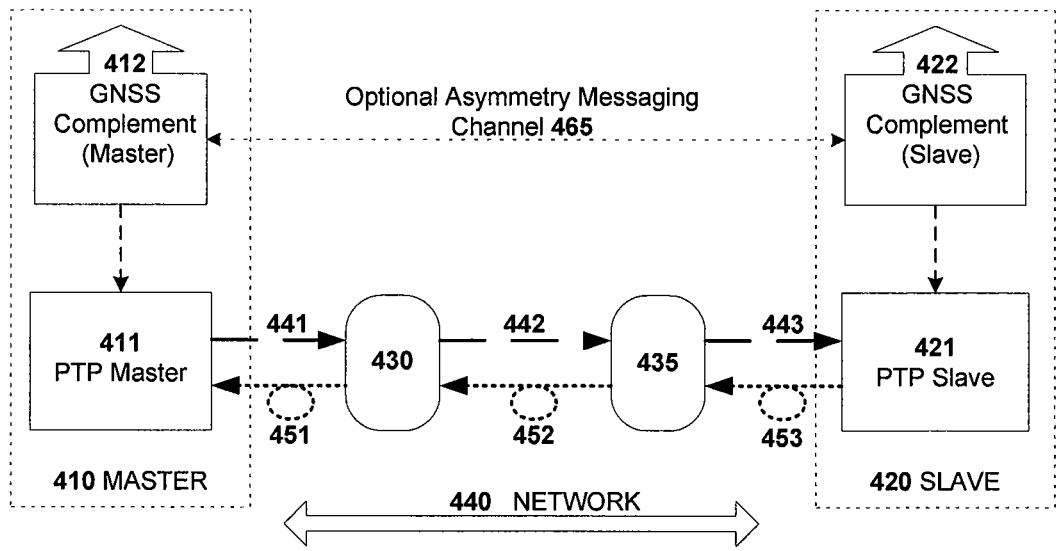
Figure 4.

UNIVERSAL ASYMMETRY COMPENSATION FOR PACKET TIMING PROTOCOLS

CROSS-REFERENCE TO RELATED APPLICATIONS

This application claims priority to U.S. provisional application Ser. No. 61/749,565, filed on Jan. 7, 2013, which is hereby incorporated by reference in its entirety.

BACKGROUND OF THE INVENTION

1. Field of the Invention

Embodiments of the present invention relate generally to time and frequency alignment systems operating over communications networks and, more specifically, to methods and apparatus for precision time transfer wherein the inherent asymmetry error introduced in networks is estimated and compensated for.

2. Description of the Related Art

It has been recognized that synchronizing network elements in communications networks to a high level of precision enables the provision of advanced services. In fact, time and frequency alignment are essential to certain types of systems. For example, accurate time alignment is required by cellular networks, services carried out in real time over a network, and network elements that use packet-based signal formats for multiplexing, transmission, and switching. Similarly, frequency alignment is required in time-division multiplexing (TDM) and media streaming systems that require fixed video or audio sample rates across multiple clients. Modern mobility services are demanding more and more bandwidth and lower and lower latency, placing increasing demands for tight time coordination in the wireless transport (radio access networks). Another example is the demand for much higher time coordination of transactions in high speed financial trading. To gain some perspective into the increasing demand on precision, whereas legacy time distribution targets at the more stringent end are of the order of sub-milliseconds, emerging application and services targets are now of the order of sub-microseconds.

The distribution of time over packet networks is now ubiquitous. The dominant method is the use of the Network Timing Protocol (NTP) for support of general timing applications in general computing applications. However, these implementations, based on existing standards and conventions are suitable for time alignments of the order of (several) milliseconds. Over the last decade, a new protocol, Precision Timing Protocol (PTP) has emerged supported by industry standards (IEEE 1588v2, ITU G.827x series). The key differentiator between NTP and PTP is that the new levels of precision that can be obtained with PTP will support the needs of a variety of new applications and services. Both PTP and NTP are protocols for exchanging time-stamps associated with time-of-arrival and time-of-departure of designated packets and are thus, in principle if not practice, capable of similar performance levels.

In both cases the single, dominant, source of time error, error that cannot be corrected by the protocol, is asymmetry. Asymmetry as considered here is the difference in transit delay of the designated event packets in the two directions between the communicating clocks. Whereas packet delay variation is an expected phenomenon in packet networks and does contribute to asymmetry, there is an underlying asymmetry component that is entirely independent of the network loading and depends substantively only on the path between the clocks. The path, as considered here, includes all transmission links, including multiplexers and signal-format converters and transmission media, and intermediate network elements, such as switches and routers, between the communicating clocks.

One approach known in the art that provides both time and frequency alignment involves computing an aligned time signal based on a master timing signal from a primary reference clock, such as a global navigation satellite systems (GNSS) satellite timing signal, which is held in precise alignment with a global clock reference. The most common GNSS in use is the Global Positioning Satellite (GPS) system. This is depicted in FIG. 1. The two clocks, CLOCK-1 110 and CLOCK-2 120 both receive timing signals 130 from the GNSS system 150. By aligning themselves to the GNSS timescale, the two clocks are, albeit indirectly, aligned to each other. Using GPS signals or other master timing signals at each network element to achieve time or frequency alignment requires each network element to be able to receive satellite time signals from GPS satellites. There are many situations where visibility of GPS satellites may be compromised, interfered with, or interrupted. It is generally accepted that whereas GPS is a reliable and robust system, in many installations the visibility of a sufficient number of satellites simultaneously may not be available continuously.

Packet-based schemes such as PTP and NTP are discussed next. One of the principal drawbacks of such schemes for transferring time is the potential asymmetry of the transit delay between the two clocks. Such asymmetry cannot be determined or estimated using PTP/NTP itself. The negative impact of such network impairments can be mitigated by combining PTP/NTP packet-based methods with other, complementary, GNSS-based schemes (e.g. GPS).

Packet-based network synchronization methods such as Precision Time Protocol (PTP) and Network Time Protocol (NTP) transfer time and frequency references using packets containing time stamps that identify the times of departure/arrival of packets. These protocols can be used to distribute timing and frequency alignment throughout a network in a point-to-point fashion similar to the way that TDM networks distribute frequency alignment, as described above. For specificity the discussion here considers PTP though essentially identical statements apply in the case of NTP and all other packet-based time transfer methods.

A PTP "grandmaster" can transfer time to a network element coupled to it, a "slave" instantiated on that network element can reconstitute the time, and then a "master" connected to the slave in the same network element can transfer time to a subsequent network element in this point-by-point fashion. PTP and NTP can also operate in a mode where the "slave" clock in a network element can communicate directly with the "master" clock system for timing purposes. In all cases, the accuracy of two-way time-transfer protocols is adversely affected by asymmetry introduced by the communications network connecting the two network elements, including asymmetry in the physical medium, asymmetry in the construction of the forward and reverse paths in the network elements, and other sources. PTP and NTP assume that transit delays between master and slave clocks are symmetric, i.e., the transfer packet delay from a master clock to a slave clock is equal to the transfer packet delay from the slave clock to the master clock. But because forward and reverse physical paths are often different in coupled network elements, they are typically not symmetric. The goal of packet-based methods is to establish the "offset from master" (OFM) of the slave. That is, if we denote the master time by $T_M$ and the slave time by $T_S$, then the goal is to establish $\epsilon$ where $T_S = T_M + \epsilon$.

The premise of time-stamped packet exchange as used in PTP (and NTP as well) is illustrated in FIG. 2 (prior art). Traditional packet-based two-way time transfer methods follow the event diagram shown in FIG. 2. The terminology used here is that from PTP but the same principles apply to all methods and protocols. Referring to FIG. 2, the sequence of events and important items of information associated with an exchange of packets between master 210 and slave 220 are:

Event A 230: Packet is transmitted by Master and time-of-departure is $t_1$.

Event B 232: Packet arrives at Slave that measures the time-of-arrival as $\tau_2$; assuming that the slave time offset from master is $\epsilon$, the actual time-of-arrival with respect to the master timescale is $t_2 = \tau_2 - \epsilon$.

Event C 234: Packet is transmitted by Slave that notes the time-of-departure is $\tau_3$; assuming that the slave time offset from master is $\epsilon$, the actual time-of-departure with respect to the master timescale is $t_3 = \tau_3 - \epsilon$.

Event D 236: Packet arrives at Master that measures time-of-arrival as $t_4$.

Such a two-way exchange of packets can provide information suitable for allowing the slave to align in time with the master (assuming that both sides have knowledge of the time-stamps). There are four measured values that can be communicated between the Master and Slave, namely, $(t_1, \tau_2, \tau_3, t_4)$. Denoting by $\Delta_{MS}$ and $\Delta_{SM}$ the transit delays between the Master and Slave and vice versa, the following equations can be established:

$$t_4 = \tau_3 - \epsilon + \Delta_{SM} \text{ (from an S-to-M packet)}$$

$$t_1 = \tau_2 - \epsilon - \Delta_{MS} \text{ (from a M-to-S packet)} \quad \text{(Eq. 1)}$$

The round-trip delay, RTD, is estimated simply as:

$$RTD = (t_4 - \tau_3) + (\tau_2 - t_1) \quad \text{(Eq. 2)}$$

The two quantities in parentheses in the right-hand side of (Eq. 2) comprise the reverse and forward offset measurements, respectively.

Note that there are two equations with three unknowns ($\epsilon$, $\Delta_{MS}$, $\Delta_{SM}$) so it is common in conventional PTP methods to assume reciprocity of transit delay between the two devices, thereby reducing the number of unknowns to 2 and therefore computing $\epsilon$, the slave time offset from master. This assumption implies that there is an inherent error in the time transfer that is related to the asymmetry of the transit delay in the two directions. Specifically, the error in time transfer will have an error that is nominally $$\varepsilon_A = \frac{\Delta_{MS} - \Delta_{SM}}{2} \quad \text{(Eq. 3)}$$

The asymmetry in transit delay of timing packets between slave and master provides a statistical bound to the accuracy of time transfer that can be guaranteed. For example, packet-based methods like PTP and NTP use separate fiber strands or fiber wavelengths for carrying the signal in the two directions (S-to-M and M-to-S). Consequently the difference in the length of the fiber strands in each direction introduces an asymmetry in transit delay. Since the velocity of light in the fiber is wavelength dependent, using different wavelengths in the two directions introduces an asymmetry in transit delay. These are in addition to asymmetry that may result from the behavior of intervening network elements. The example of fiber transport just cited is one of a number of different transport options supported the effective physical layer of the protocol stack. The network path may be over any network transport including a variety of physical layers transports including but not limited to:

1. Native Physical Layer Ethernet
2. SONET/SDH (Synchronous Optical Network)
3. Optical Transport Network (OTN)
4. Microwave radio
5. Millimeter wave radio
6. Non-Line-of-Sight Radio
7. xPON (different flavors of Passive Optical Networking)
8. DOCSIS (standard applicable to transmission over cable-TV networks)
9. Infiniband (standard for intra-computer-system communication)

The transport technology introduces some transit delay impairment in the form of delay variation. In addition, since the transmission path is distinct in the two directions, transit delay asymmetry can be introduced. Prior art methods for addressing the asymmetry include calibration of the transit delays in the two directions. The calibration step is generally performed when there is no information traffic such as during the equipment deployment phase or during intervals where the network is taken out of service for maintenance purposes or if the transmission medium is dedicated to timing with no information traffic present. Other methods in the prior art include the use of burst transmission employing the same link in the two directions as described in U.S. Pat. No. 8,594,134, entitled "Precision Time Transfer over Optical Fiber," and the use of multiple wavelengths as described in U.S. Pat. No. 8,600,239, entitled "Precise Clock Synchronization over Optical Fiber."

The asymmetry introduced by the transport layer is depicted in FIG. 3. For simplicity, the asymmetry is shown with delay greater in the reverse path (from slave to master).

Thus, the ability of PTP and NTP to accurately transfer time between network elements in a packet network is limited. Specifically, the asymmetry in transit delay of timing packets between slave and master clocks provides a bound to the accuracy of time transfer.

SUMMARY OF INVENTION

The notion of a "PTP aware" path is one current proposed approach to reduce asymmetry effects. In a fully PTP aware path there is the notion of on-path support mechanisms such as boundary clocks and transparent clocks at every switching or routing node. However, on-path support methods only address time-transfer errors introduced inside network elements and any asymmetry in the transmission medium, such as, for example, the fiber strands for the two directions of transmission, cannot be compensated for by on-path support mechanisms. Furthermore, in a real operational network, which may traverse different operational domains administered by different entities, full on-path support is a difficult challenge. However in certain managed network scenarios full on-path support can be contemplated. Nevertheless, the universal asymmetry compensation method described herein mitigates the asymmetry in a network path without requiring on-path support mechanisms such as transparent clocks and boundary clocks.

The universal asymmetry compensation methods disclosed herein also apply when there is full on-path support, no on-path support, or partial on-path support, where only some of the network elements in the path implement boundary clock or transparent clock functionality. The universal asymmetry compensation method can be designed to work synergistically with the emerging on-path support mechanisms to allow for current adoption of PTP time transfer with the flexibility of adjusting the deployment approach and capital and operational cost as PTP matures. The key components in the method are shown in FIG. 4.

Embodiments of the present invention provide methods for improving the accuracy of synchronization when a clock at a first network element is to be time-aligned with a clock in a second network element. The first and second network elements are connected over a network comprising network elements and transmission links. Timing signals comprising time-stamped packet flows are exchanged between the two network elements according to a packet-based method protocol such as PTP and the clock at the second network element designated the slave is aligned using the timing information contained in the packet stream to the clock in the first network element, considered the master. The time-alignment error that is introduced in such methods as PTP and NTP is bounded from below by the asymmetry of propagation in the physical transport layer. The present invention identifies methods for calibrating the asymmetry of the network, thereby improving the accuracy of the time alignment. Embodiments described herein can operate in a normal network operating mode where the network is carrying live traffic, as well as when the network is not carrying live traffic.

Embodiments of the present invention provide methods for improving the synchronization when the clocks at the first and second network element are synchronized by aligning each to a common source such as provided by a GNSS system (e.g. GPS). The present invention identifies methods to assist the GNSS synchronization, thereby improving the quality of the time alignment.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3 depicts the asymmetry in transit delay for the two directions of transmission between master and slave. For convenience the reverse (slave to master) direction is shown as being longer.

FIG. 4 depicts a deployment scenario, according to an embodiment. The master and slave clocks are connected over a network and each have GNSS adjunct (complementary) systems. The network comprises switches/routers and other network elements that may or may not provide PTP on-path support.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
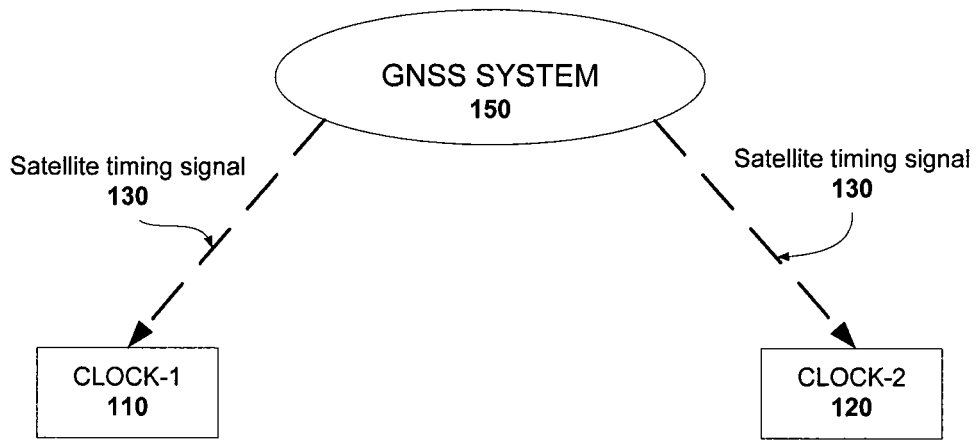
FIG. 1 depicts a conventional method for aligning two clocks by aligning each with a common reference such as GNSS (Global Navigation Satellite System).
Figure 2:
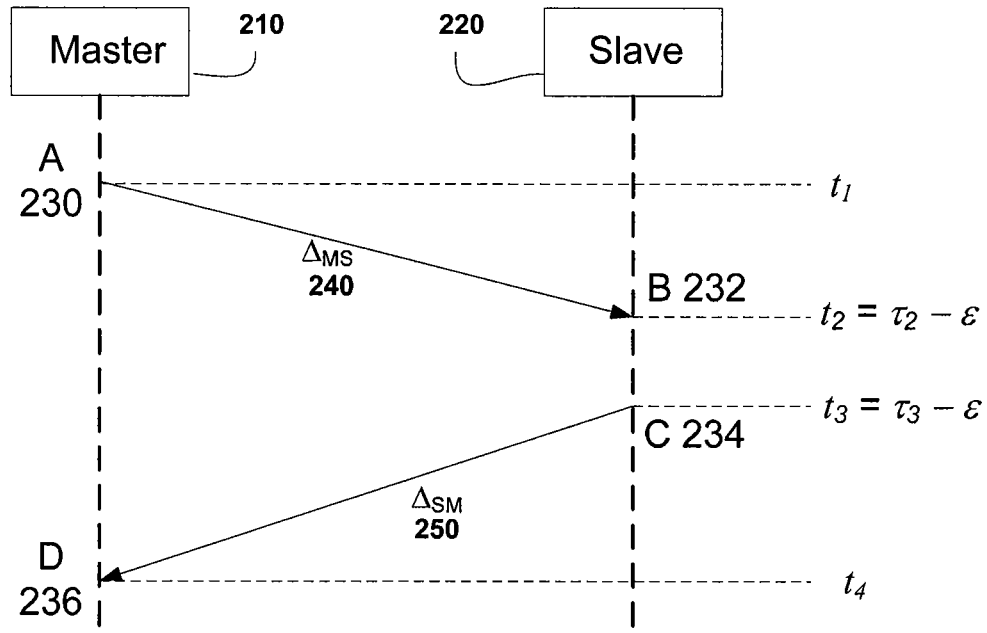
FIG. 2 provides an event diagram illustrating the timestamps associated with the times of departure and times of arrival of packets constituting the two-way timing signal as the packets are transferred between master and slave.

With reference to FIG. 4, one embodiment of the universal asymmetry mechanism is logically partitioned into:
  a) A slave GNSS complementary asymmetry compensation function 422.
  b) An optional master GNSS complementary asymmetry compensation function 412.
  c) An optional Asymmetry Messaging Channel 465.

The slave GNSS complementary function 422 is associated with the PTP slave function 421 in the slave clock device 420. Likewise, the master GNSS complementary function 412 is associated with the PTP master function 411 in the master clock device 410. The optional messaging channel 465 is logical and can be implemented in the form of an IP packet stream over the network 440 connecting the master 410 and slave 420.

One objective of the invention is to estimate the delay asymmetry in the network path by utilizing the complementary support of GNSS services. As the network evolves there will be PTP aware nodes in the path. In this case there will still be a residual delay asymmetry that will be estimated by the method. A further objective of the invention is utilize the supporting GNSS services in a manner that mitigates the impact of GNSS jamming, intentional or unintentional. A further objective of the method is to permit operation in degraded GNSS reception environment such as urban canyons and indoor applications. A further objective of this method is detecting spoofing on the PTP service path.

There are two distinct operating modes:
  a) Direct GNSS support.
  b) Indirect GNSS support.

The direct method does not require the master GNSS functionality 412 or the messaging path 465. The method utilizes the Coordinated Universal Time (UTC) traceability of GNSS services to provide the same level of traceability at the slave location. That is, the slave clock 420 uses the GNSS receiver to establish its time that is linked to the GNSS timescale or alternatively traceable to UTC such as is the case with GPS. The PTP slave 421 aligns itself using PTP, a packet-based method using message (packet) exchanges, with the master 411. Since the master is notionally aligned with UTC, either using a GNSS receiver 412 or by some other means, the slave device 420 has two traceability paths to UTC and by combining the two achieves robustness. That is, the method can be viewed as providing an ultra-robust GNSS time transfer to the slave location.

The indirect method does require the master GNSS functionality 412 as well as the message path 465. There are a variety of message path options. One embodiment utilizes a default option, availing of the PTP management messages described in IEEE 1588-2008 Clause 15. The method leverages the advantages of ultra-precise time comparison supported by GNSS common-view and all-in-view methods. The principle underlying common-view or all-in-view methods is to consider the reception of a particular satellite (or similar groups of satellites) as an opportunity to simultaneously observe the time differences. The master measures the difference or error of the master timescale with respect to the satellite group while at the same time the slave performs the same measurement with respect to the slave time. The master communicates the measurement to the slave via the message channel and the slave can algebraically combine both measurements to cancel out the reference to the common satellite group. During good satellite reception conditions the slave now has two independent estimates of the time error with respect to the master: the common-view or all-in-view based estimate just described and the time error estimate over the PTP path. The difference is an estimate of the delay asymmetry in the current path over the network being used to communicate the PTP event messages between master and slave.

The core of the invention is the Slave GNSS Complementary Asymmetry Compensation method. This method can be operated with several type of GNSS support.

The Direct GNSS support mode is discussed above. In Direct GNSS operation the asymmetry mitigation is directly traceable to UTC via the time traceability of the GNSS system. In the direct mode the GNSS system may operate in a standard line-of-sight configuration implying that the GNSS antenna is provided a clear view of the sky with no intervening obstacles such as buildings and roofs that would obscure satellite visibility. An important feature of the method is that it can also support challenging GNSS reception environments including, but not limited to, partial-sky view, intermittent jamming conditions, and multipath in reflection-rich environments such as urban canyons. In addition, with the use of high sensitivity receiving technology the method will also support an indoor reception environment. The principal design component that supports these more challenging real worlds environments is that the method only uses the GNSS information to estimate the asymmetry for a given network path configuration between master and slave. Since path conditions are relatively static in real networks (infrequent path rearrangements), the method leverages the extended time windows to maximize the protection against poor GNSS reception conditions.

An extension of the Direct GNSS support mode is the Indirect Mode of operation. In the Indirect operating mode the asymmetry mitigation is traceable to the originating PTP grandmaster timescale. To support this mode of operation the GNSS sub-system operates in either a common-view or all-in-view mode. The Indirect mode is an extension of the Slave GNSS Complementary Asymmetry Compensation method. To summarize:
  a) Direct GNSS support mode utilizes:
    i) Slave GNSS complementary Asymmetry compensation (in direct mode).
  b) Indirect (or common view) GNSS support mode utilizes:
    i) Master GNSS complementary GNSS Asymmetry compensation.
    ii) Asymmetry Optional Messaging Channel
    iii) Slave GNSS complementary GNSS Asymmetry compensation (in indirect mode).

Slave GNSS Complementary Asymmetry Compensation

Figure 5:
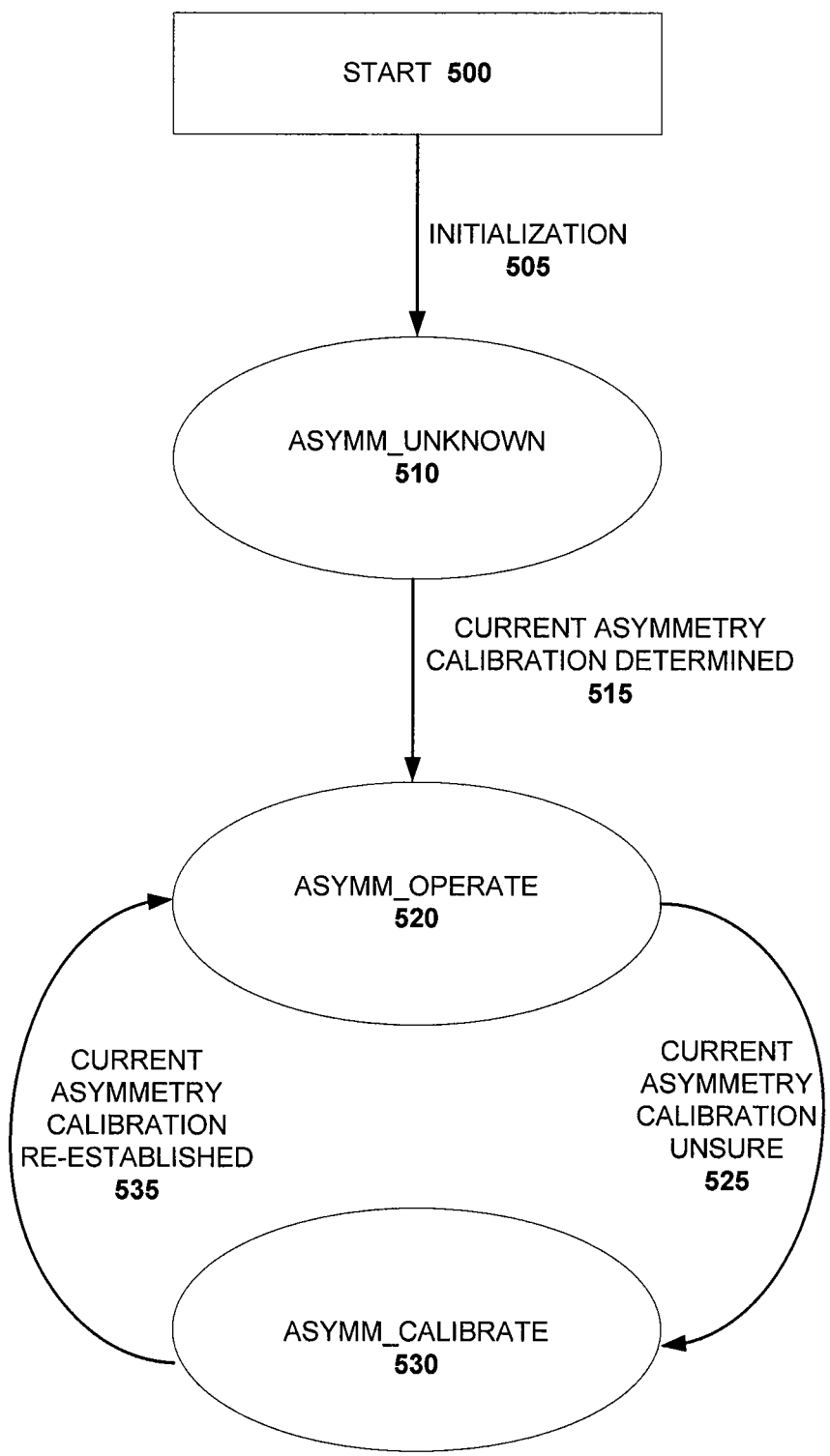
FIG. 5 depicts the state machine associated with the estimation and qualification of the asymmetry according to one embodiment.

The Slave GNSS Complementary Asymmetry Compensation algorithm is now described using state machine formalism. FIG. 5 illustrates the high level state machine. The starting point 500 is at power-up or when a reset is asserted. An initialization phase 505 is implemented to set all the provisionable items such as bandwidths and time-out parameters and the different elements such as the GNSS receiver are allowed to come out of warm-up state.

Post-initialization the system is in an "ASYMM_UNKNOWN" 510 state. In this state the PTP message exchanges are occurring between master and slave and the GNSS receiver is providing time information as well but the asymmetry has not been estimated or, as will be shown later, the current estimate is considered incorrect. An initial estimate of asymmetry is determined and the system then progresses to the next state, "ASYMM_OPERATE" 520. In this state the asymmetry has been estimated and is used to adjust the slave clock to account for asymmetries in the network 440 over which the PTP message exchanges between master and slave take place.

Figure 6:
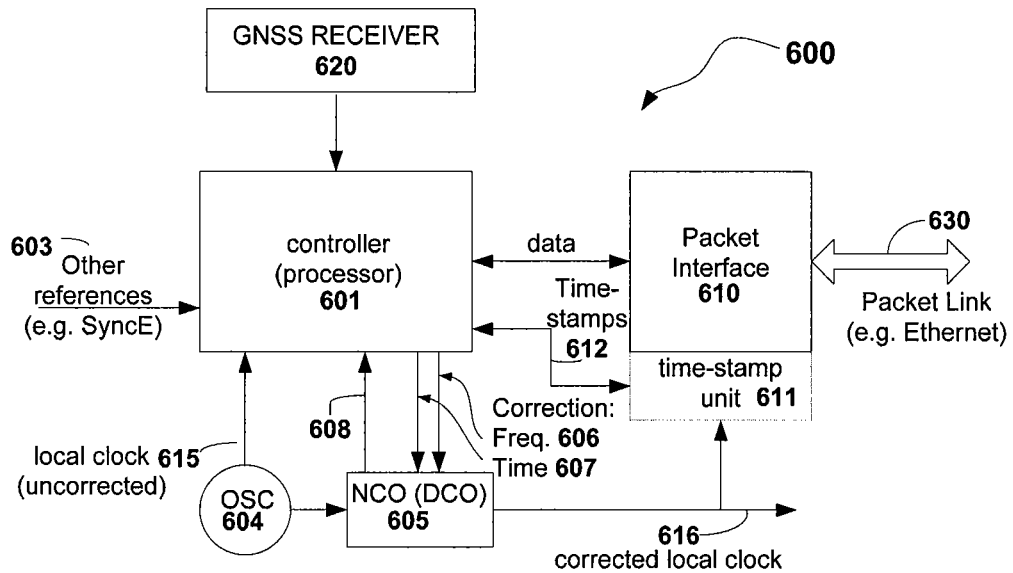
FIG. 6 provides a block diagram of an embodiment of the slave device. The same hardware units can be used to implement the master device.

FIG. 6 depicts a suitable embodiment of the slave device 420 (600). It is well known in the art that from a hardware viewpoint the master and slave devices can use similar hardware though the master often utilizes a higher-performance oscillator than the slave and, further, whereas the slave may alter its timescale to match the master, the master does not alter its timescale to match the slave. The master generally sets its timescale based on the GNSS timing reference or to a "higher-order" master (not indicated here).

Asymmetry Algorithm Data Definitions

Figure 7:
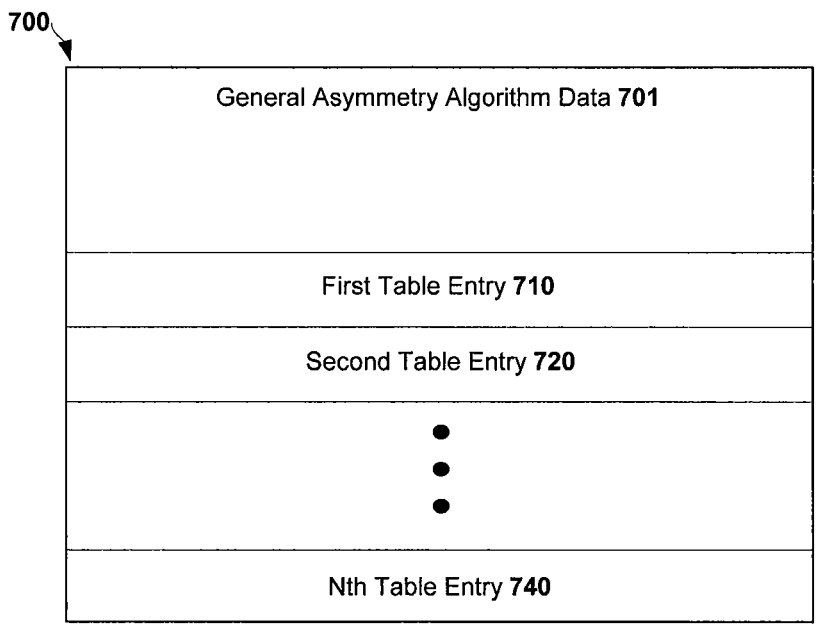
FIG. 7 depicts a database structure used in an embodiment.

The Asymmetry Algorithm stores its data in a structure that is organized in a tablular as illustrated in FIG. 7. There is a table associated with each PTP master or grandmaster supported. In a typical telecom profile client there would be two tables for support of the Grandmaster and Alternate Grandmaster. In the more general case there is an Asymmetry table associated with each path to each Grandmaster. The invention anticipates the simultaneous use of multiple paths between a Grandmaster and the PTP slave. A preferred embodiment is the support of two or more PTP service flow paths wherein one or more PTP service flow paths is provisioned with no on-path support and one or more PTP service flow paths with on-path support. In general multiple independent paths are used for both verification and ensembling functions. A important use case is when the on-path support PTP flow operates over the same physical assets (links, switches, routers . . . ) as the PTP service flow with no on-path support. In this important use case the path with no on-path support is used to verify proper operation of the on-path support components on the path.

The database 700 depicted in FIG. 7 includes the general asymmetry algorithm data section 701 supports the high level state machine shown in FIG. 5. The preferred embodiment for the data structure 700 includes the following data elements in the general asymmetry algorithm data 701 section:
  a) GM_ID: The identifier indicating which grandmaster (GM) association is supported with the table.
  b) Index: the indicator of which entry of the table is currently active. Since each entry is associated with a unique PTP service path, this indicates which path is currently being used.
  c) Astate: The state of the high level asymmetry state machine. The three states (ASYMM_UNKNOWN, ASYMM_OPERATE and ASYMM_CALIBRATE) are supported.
  d) Asymm_Calibrate: The asymmetry compensation value to be applied.
  e) Time_Error_Baseline: The last known good estimate of the Time Error of the PTP slave. The Time_Error_Baseline is updated during the ASYMM_OPERATE state.
  f) Time_Error_Baseline_Age: the duration in seconds since the last update of the Time_Error_Baseline g) Skip: the duration in seconds that the state machine will stay in a wait state prior to the next real action. This is used to support appropriate convergence times for estimates as needed.

The subsequent sections 710, 720, . . . , 740, are used for the per-path data entries. The algorithm can support a cache of up to N calibrated paths. The data entries include:

a) Cal_category: The secondary state indication that is updated during the higher level calibration state may be indicative of the following states:
  i) ASYMM_UNCALIBRATED: The entry has no calibration information
  ii) ASYMM_CALIBRATED_LEVEL_[A-E]: The calibration state process allows for up to 5 calibration assessments windows. The multiple windows may be used in a clustering process to improve overall robustness of the calibration.
  iii) ASYMM_PRECALIBRATED: This calibration state is indicated when the calibration process has been achieved with a user override.
  iv) ASYMM_CALIBRATED_COMPLETE: This is the normal final calibration state indicating that an automatic calibration has been completed and verified for this table entry.
b) Cal_count: Indicates the count of calibration windows including in the calibration. Note that calibration refinement will continue during the ASYMM_OPERATE state.
c) Calibration: the asymmetry delay correction value to be applied for this table entry.
d) Time_bias_meas: the filter estimate of the current asymmetry time bias measurement.
e) Time_bias_meas[A-E]: The set of up to 5 time-bias estimates used to support the clustering process.
f) Bias_asymm_factor: An optional second order compensation term to accommodate residual load skew error when there is a load imbalance between forward and reverse directions of PTP service flows.
g) Residual noise: An estimate of the uncertainty of the calibration value.
h) Physical_Noise: An optional estimate of the physical noise level of the current path. May be used in verification process to ensure accurate path matching.
i) Time_last_used: Timestamp reflecting when this path entry was last associated with the ASYMM_OPERATE state.
j) RTD[Min,Mean,Max]: These three metrics describe the round trip delay window associated with this calibration data.

ASYMM_UNKNOWN State 510 Description

The ASYMM_UNKNOWN state is only entered after a re-initialization of the algorithm. During this state no asymmetry compensation is available to the slave clock. If the slave clock provides timing services during this period they are not strictly traceable to either GNSS in direct mode or the PTP master in indirect mode. This lower performance level should be indicated in any services supported by the PTP slave.

The unknown state may only be exited once a current asymmetry calibration is determined. The following steps are performed to determine a valid calibration.

Step 0: Initialize the Asymmetry Tables

As will be described in detail shortly the algorithm maintains delay compensation tables for each Master or Grandmaster supported in the system. In the preferred embodiment the algorithm supports the storage and retrieval of the last valid tables for a GM in non-volatile memory. If there is a match with the current PTP masters providing services then the table for this master is retrieved. If there is no match then table is initialized to indicate no valid asymmetry data. In the preferred embodiment this is accomplished utilizing the state indication of a lower level state machine associated with the ASYMM_CALIBRATE state. The state indicated is termed the calibration category and is initialized to ASYMM_UNCALIBRATED for all entries in the table. As will be described the asymmetry table supports entries associated with PTP path metrics that indicate or provide a signature of a unique PTP path. In one embodiment, the signature associated with a path may be round-trip-delay. In another embodiment, the signature may include time delay estimates determined with and without-on path support. In such a case, two separate PTP streams may be run, one of which is recognized by boundary clocks and the other of which is a raw network that is not recognized by boundary clocks, and these two streams may be used together to determine the signature.

As described in the background the basic PTP time-stamps available at the slave can be used to compute an estimate of the roundtrip delay. However in the preferred embodiment the roundtrip delay is treated as a statistical estimate since the offsets include single side delay noise processes. There are multiple methods to mitigate this noise and a preferred approach is described in U.S. Pat. No. 8,064,484, entitled "Enhanced Clock Control in Packet Networks," which is hereby incorporated by reference in its entirety. The asymmetry compensation algorithm can work with any selected approach. In similar fashion the time error ($T_{err}$) calculation discusses in the background is actually a statistical estimate in the preferred embodiment to mitigate packet delay variation.

The algorithm will wait until a valid roundtrip delay estimate is available for the current PTP path. The next step after this typically small (several minute) waiting period is to update the asymmetry table entry associated with the current round trip delay.

Step 1. Update Current the Asymmetry Table Entry

The first step is to determine if the current roundtrip delay estimate matches an existing window in the table. As described later the algorithm estimates the expected minimum and maximum roundtrip delay for a given path. If the current roundtrip delay matches say the roundtrip delay window of the $i^{th}$ entry in the table then this index is considered as a candidate match.

Step 2A. If Candidate Match Determined

If a candidate match is found then the next step is to validate the match. To perform this match GNSS services must be operating properly. In a direct mode application the preferred embodiment requires:

a) GNSS services have achieved a position-fixed or surveyed-in state.
b) The GNSS device is tracking a minimum number of satellites.
c) The Dilution of Positions scores are at acceptable levels.
d) The Pseudo-Range residual dispersion is within acceptable levels.
e) The Timing Services are operating with current UTC state correction estimates.

The conditions for normal operation for the indirect mode will be discussed later in the extension part of the detailed invention description.

The algorithm will normally wait for these conditions to pass before proceeding. Optionally in the preferred embodiment the user may override these requirements. This override calibration category state is termed ASYMM_PRECALIBRATED. In this mode the user takes responsibility to enter the correct asymmetry compensation value. In this pre-calibration condition the algorithm will then advance to the ASYMM_OPERATE state. If there is no user override the algorithm will continue as described herein.

If GNSS services are operating in normal condition then the algorithm compares the difference between the time error estimate of the slave clock based on both the current PTP measurements and the GNSS measurements. If the PTP services are not operating normally (congestion condition, high loss or error rate), the algorithm will wait until normal PTP services return. Once a proper difference measurement is obtained, a Bayesian hypotheses test condition approach is used to address the statistical nature of the test case. If the conclusion of the test is that the match is valid then the algorithm will advance to the ASYMM_OPERATE state. If not then the algorithm will procede to the candidate match not determined sub-state.

Step 2B: Candidate Match Not Determined

The algorithm will wait for normal GNSS service condition before proceeding. If GNSS services are available then the time error estimate is obtained from the GNSS measurement. During the same time period a time error estimate is also obtained for the PTP service flow. The asymmetry time error estimate is obtained by subtracting the GNSS time error estimate from the PTP service flow estimate. This step removes the current slave clock error as a common mode term and generates the required calibration time error estimate. As discussed later the GNSS time error estimate process is different for the direct or indirect mode. The algorithm must determine the index to create this new entry. If there was a previous round trip delay match index then the entry is overwritten into this slot in the table. If there is no previous match then the algorithm calls the available slot selection function to select a new slot entry to use or re-use. This time error estimate is used as calibration entry for this slot. The roundtrip delay estimate is used as the mean entry for the new window. The maximum and minimum of the window are initially established as a fixed delay distance above and below the sample mean. Once the entries in the selected table slot are updated the algorithm will then procede to the ASYMM_OPERATE state. These statistical estimates (asymmetry calibration, roundtrip mean, roundtrip minimum and roundtrip maximum) are then further refined while the algorithm is in the ASYMM_OPERATE state.

ASYMM_OPERATE State 520 Description

The ASYMM_OPERATE State is the normal operating state for the algorithm. During the operating state the time control of the PTP slave is active and the general Asymmetry Calibration value is actively used to compensate path asymmetry. The ASYMM_OPERATE state will not perform any update of values or transition to the ASYMM_CALIBRATE state if the PTP service flow is not operating normally. If the PTP service flow is operating normally the next action is determined based on the round-trip delay metric for the current path selected. The current path index is maintained in the general section of the asymmetry table. If the current round trip delay estimate is within the expected window then the current path asymmetry compensation is deemed relevant. The round-trip delay window limits are defined by the minimum and maximum roundtrip delay limits maintained in the general section of the table.

If the asymmetry compensation is relevant then the asymmetry estimate refinement process is invoked to utilize additional GNSS observations to improve the asymmetry estimate. The refined estimate is updated for both the active table entry as well as the general section asymmetry estimate. Additionally a filtered estimate of overall time_error_baseline is updated. The time error baseline is the current time error correction required to adjust the local clock timescale into alignment with the master clock timescale. This value is used to assist validation of a match during the calibration process. Finally, the Time_last_used timestamp is updated indicating that the algorithm just used this path asymmetry entry.

If the asymmetry compensation is outside the window then the compensation is deemed unsure. In this situation it is highly likely that there has been a path rearrangement event. The algorithm will transition to the ASYMM_CALIBRATE state in this case.

ASYMM_CALIBRATE State 530 Description

Figure 8:
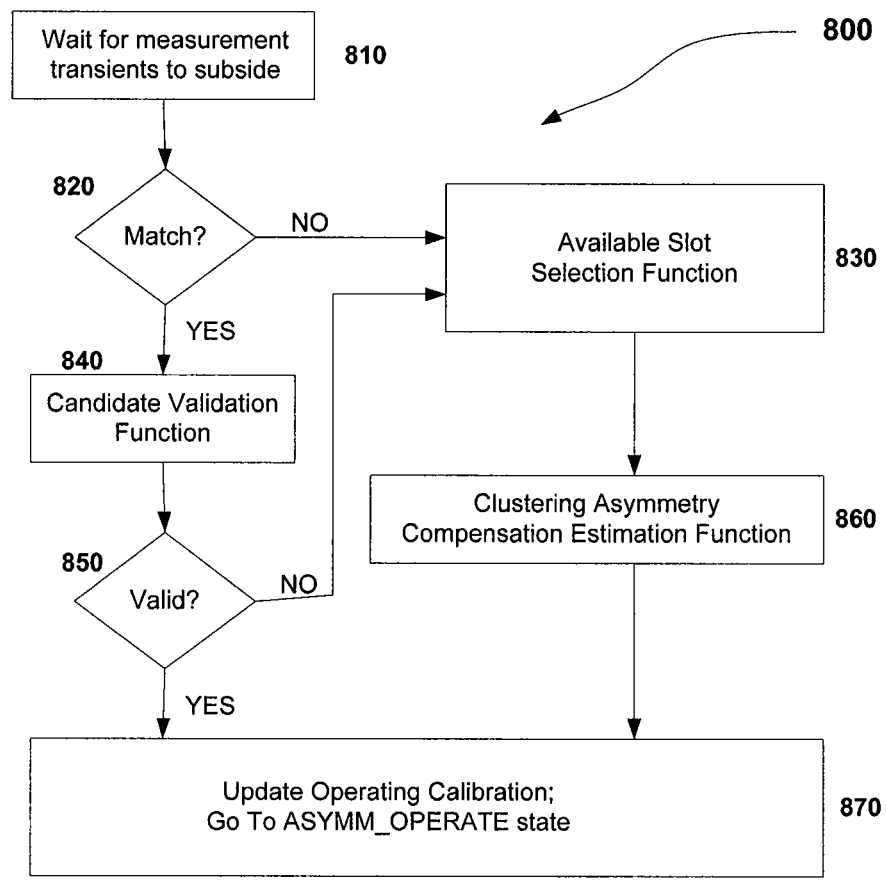
FIG. 8 provides a flow diagram of the processes in the asymmetry calibration state, according to an embodiment.

FIG. 8 illustrates the ASYMM_CALIBRATION flow chart that describes this portion of the algorithm.

As described in FIG. 8, entry into the ASYMM_CALIBRATE 530 occurs when the current calibration is determined to be unsure (525) while in the ASYMM_OPERATE 520 state. This transition is caused, most likely, by a service interruption in the PTP flow. Consequently, during the calibration process the time control of PTP slave is suspended. The estimation process requires a settling period to stabilize the estimates for the new path. This is the purpose of the first wait functional block 810 shown in the calibration process flow diagram.

The next step is a flow decision 820 based on if there is a current candidate match in the asymmetry table associated with the grandmaster ID of the PTP service flow. If the current roundtrip delay estimate matches the roundtrip delay window of, say, the $i^{th}$ entry in the table, then this index, i, is considered as a candidate match and the algorithm flow proceeds to the candidate validation function 840. If no match is found the flow transfers to the available slot selection function 830.

If a candidate match is found then the next step is to validate the match. This validation is performed in the calibration validation function 840 described later. Following validation, the next step is a decision based in the Boolean validation flag returned from the calibration validation function. If VALID=YES (true) then the next step is the function 870 where the operating calibration state information is updated and the state machine transfers back to the operating state ASYMM_OPERATE state 520. If INVALID (VALID=NO) then the next step is to merge back to the same path as if no candidate match is determined and proceed to the available slot selection function 830.

If a candidate match cannot be determined and validated the next step 830 is to allocate a slot in the per path asymmetry table to the asymmetry associated with the grandmaster ID of the PTP service flow. This is performed in the Available Slot Selection Function 830 described later. The function will return the slot index to be used in the Clustering Asymmetry Compensation Estimation Function 860 described later. The clustering asymmetry estimation function will populate the requested slot index with the appropriate calibration data.

The final step 870 in the calibration process is to update the operating state information and return to the operating state ASYMM_OPERATE state 520. The data update is associated with the following general asymmetry algorithm data items:
- a) Index: the indicator of which entry of the table is currently active. This is either the slot index from the available slot selection or the index from the candidate match path.
- b) Astate: The Astate is updated to ASYMM_OPERATE to trigger a return to the operational state. This update is the last update action to ensure proper behavior.
- c) Asymm_Calibrate: The operating asymmetry calibration value which is a copy of the calibration value for the operational slot index just described in (a) above.

The Calibration Validation Function 840 is described next.

Round trip delay matching is necessary but not fully sufficient to determine what asymmetry delay compensation to apply. A simple example is a ring network structure where initially the forward direction traverses the ring in a clockwise direction and the reverse direction traverses the ring in a counterclockwise direction. The roundtrip delay is simply the delay around the entire ring. Now if the directions of flow are reverse and there is not too much asymmetry difference the round trip delay will still be essentially the same.

The algorithm includes a validation function before accepting the proposed compensation. During the validation period the time control of PTP slave is suspended. The performance during this period is determined by the nature of the frequency control. Multiple approaches can be used. The preferred embodiment is to maintain ongoing frequency control. This can be done by utilizing the rate of change of forward and reverse offset PTP measurement as a measurement of frequency error. The key recognition is that the frequency measurements from a PTP service flow are still useful even without knowledge of the asymmetry. Other viable alternatives to utilize other readily available reference such as synchronous Ethernet or GNSS and operate the PTP slave in a multiple input mode as disclosed in U.S. Pat. No. 8,064,484, entitled "Enhanced Clock Control in Packet Networks." Alternatively frequency control may be suspended and slave clock will operate based on the phase, frequency and drift performance of the local oscillator.

The validation includes several test conditions:
- a) GNSS mismatch: In normal situations this is the only validation test case required. If GNSS services are operating in normal condition then the algorithm compares the difference between the time error estimate of the slave clock based in both the current PTP measurements and the GNSS measurements. If the PTP services are not operating normally (congestion condition, high loss or error rate), the algorithm will wait until normal PTP services return. Once a proper difference measurement is obtained, a Bayesian hypotheses test condition approach is used to address the statistical nature of the test case. If the GNSS services are not available during a reasonable wait time then the algorithm progresses to the autonomous test conditions described below.
- b) Autonomous reversal: The algorithm maintains a baseline estimate of the time error just prior to the transition to the calibration state. The proposed asymmetry is used to compensate the current estimate of time error. If this new target time error is further away than the un-compensated time error then a non-matching condition is asserted. A Bayesian hypotheses test condition approach is used to address the statistical nature of the test case.
- c) Optional Physical Noise Category mismatch: The delay variation in the PTP service path includes load dependent elements (buffer delays waiting for shared resources such as an egress buffer for access to a transmission link) as well as load independent delay variation associated with the physical path. Under modest load conditions, a well-designed PTP slave clock algorithm can support metrics that estimate the level of physical delay noise both in the forward and reverse directions. These metrics can serve as a signature of the physical link currently being used and if the signature deviates excessively from the previously recorded signature then the non-matching test condition can be asserted. The details of this optional test case are outside the scope of the core algorithm.

The calibration validation function 840 returns the results of the hypothesis test. If the validity assertion is determined to be supported the function will return VALID (VALID=YES); if not it will return INVALID (VALID=NO).

The Available Slot Selection Function 830 is described next.

This function selects that index into the table entry that will be used for a particular path calibration element. The basic operation is to search sequentially through the N possible elements in the selected asymmetry table to find the first entry that is in the unused state. The table is managed so that a used slot will have a Cal_category state of either ASYMM_PRECALIBRATED or ASYMM_CALIBRATED_COMPLETE.

The search is suspended at the first unused slot detection and the index for this available slot is returned. If there are no unused slots in the table then certain entries in the table are retired following a simple aging protocol. The older entries in the table will be indicated by a lower value of the Time_last_used timestamp. A Block of Entries (size B) will then be eliminated from the table. The value of B may not exceed one less than the size of the table, i.e. (N−1) and any Pre_Calibration state entries must be preserved. The oldest B entries are included in the block to be re-initialized. The state indicated is termed the calibration category and is initialized to ASYMM_UNCALIBRATED for all entries in this block of B entries.

Clustering Asymmetry Compensation Estimation Function 860 is described next.

The Clustering Asymmetry Compensation Estimation function 860 determines the asymmetry calibration estimate to be utilized for the current path along with associated path metrics. The primary path metric is the round trip delay estimate. The preferred embodiment of the algorithm supports 5 clustering windows to ensure a robust calibration. In the preferred embodiment the clustering windows are utilized to optimize the estimation of the asymmetry calibration value. The round-trip estimation process operates as a non-windowed estimator during the entire calibration process.

The roundtrip delay estimation process starts by using the mean entry for the new window. The maximum and minimum of the window are initially established as a fixed delay distance above and below the sample mean. These values are selected to be large enough to accommodate the worst case noise anticipated for the transport class associated with the PTP service flow. Transport class is used in the preferred embodiment to address the large dynamic range of delay jitter in real operating networks. For example PTP services over dedicated physical paths will have low jitter levels while other transports will have larger jitter bounds (e.g. Gigabit or Higher Ethernet, Microwave . . . ). When a transport class is provided by the user to a PTP slave it will enhance the convergence time and accuracy of the estimation processes. In the preferred embodiment the roundtrip delay mean estimate is considered a stream oriented process. The time constants for this filter are considered to be constrained by the need to obtain valid offset data with latencies short enough to support the control of commercially viable oscillators. In cases where there is additional external support to maintain the effective frequency of the local oscillator the time constants can be extended. An example of a frequency assist mechanism is Synchronous Ethernet. Assuming there is no external frequency support the following constraints apply. The constraint for the PTP slave clock limits the time constants to the range of minutes for lower end quartz and silicon MEM technology to sub-hour limits for atomic based oscillator technology.

The filtered mean round-trip delay stream process is used to both refine the round-trip window estimates and detect a path disruption. The path disruption assessment is performed throughout the clustering process. If the current round trip delay estimation value deviates from the window for the path disruption detection timeout (PATH_DISRUPTION_TIMEOUT), then the clustering process is terminated and the algorithm returns to the start of the ASYMM_CALIBRATION state.

The round trip delay window refinement process updates a sample standard deviation for the stream of round trip delay estimates. It uses this noise estimate and associated confidence intervals to refine the current roundtrip delay window maximum and minimum thresholds. In the preferred embodiment these limits are based on an assumption of the shape of the distribution function based on the transport class. The invention anticipates a more advanced approach based on discovering the distribution process using statistical methods such as method of moments.

The general algorithmic approach for the asymmetry calibration estimation process utilizes N non-overlapping time windows to extract N Asymmetry Calibration 'Estimates. In the preferred embodiment the set of windows is set to N=5. For each window a calibration estimate is obtained as follows:
  a) If GNSS services are operating in normal condition then the algorithm compares the difference between the time error estimate of the slave clock based in both the current PTP measurements and the GNSS measurements. As discussed later the GNSS time error estimate process is different for the direct or indirect mode. If the PTP services are not operating normally (congestion condition, high loss or error rate), the algorithm will wait until normal PTP services return.
  b) If GNSS services are not operating normally during the $i^{th}$ window calibration the calibration is considered invalid for this particular window. In the preferred embodiment at least three of the windows must have a valid calibration estimate. If this condition is not met the algorithm will return to the start of the calibration state to restart the process.

After the N window measurement process is complete, the algorithm utilizes a clustering algorithm to obtain an overall estimate of the asymmetry calibration value for the current path. A key component of clustering algorithms is the threshold estimate used to generate a cluster and properly remove outliers. Examples of such algorithms are described in U.S. Pat. No. 8,385,212, entitled "Method and Apparatus for finding latency floor in packet networks," and U.S. Pat. No. 8,427,963, entitled "Method and System for analyzing and qualifying routes in packet networks," which are hereby incorporated by reference in their entireties. The noise or uncertainty associated with this threshold is related to the uncertainty in both the GNSS service performance level as well as the PTP service flow uncertainty during calibration. The uncertainty in the roundtrip delay estimate process just described is directly related to the uncertainty in the PTP time estimates. In the preferred embodiment the roundtrip delay uncertainty is utilized to establish the uncertainty band for the PTP time estimated. The GNSS time uncertainty is obtained from the metrics such as pseudo range residuals available from the GNSS sub-system. If the uncertainty level is acceptable and there are at least 3 window estimates in the cluster then the cluster average is utilized as the overall asymmetry calibration estimate. In this case the general section of the asymmetry table is updated and the algorithm returns to the ASYMM_OPERATE state. If the cluster is determined to not be acceptable the ASYMM_CALIBRATE process is restarted.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

What is claimed is:

1. A method of correcting a clock, comprising:
  determining if a table, which stores asymmetry time error estimates for one or more network paths, includes an entry associated with a given network path, wherein each of the asymmetry time error estimates stored in the table is obtained with global navigation satellite systems (GNSS) support;
  if the table includes the entry associated with the given network path, correcting, based on an asymmetry time error estimate for the entry, a time delay estimated using timing packets received over the given network path; and
  correcting the clock based on the corrected time delay estimate and time contained in the timing packets.

2. The method of claim 1, wherein the entry associated with the given network path is identified based on a corresponding signature determined from the received timing packets.

3. The method of claim 2, wherein the signature comprises a roundtrip delay estimate.

4. The method of claim 3, wherein identifying the entry associated with the given network path comprises:
  determining if the table includes a candidate entry for a roundtrip delay window which matches the roundtrip delay estimated from the received timing packets; and
  if the table includes the candidate entry, validating the candidate entry using hypothesis testing.

5. The method of claim 2, wherein the signature comprises transit delay estimates determined using the given network path with and without on-path support.

6. The method of claim 1, wherein each of the asymmetry time error estimates stored in the table is obtained by determining a difference between time error estimated using GNSS timing signals and time error estimated using timing packets transmitted over a respective network path.

7. The method of claim 6, wherein, for each asymmetry time error estimate, the time error difference is estimated in N non-overlapping time windows, and a clustering algorithm is applied using the time error differences in the N non-overlapping time windows to obtain the asymmetry time error estimate.

8. The method of claim 1, wherein the GNSS support is provided in one of a direct support operating mode in which asymmetry mitigation is directly traceable to Coordinated Universal Time (UTC) via time traceability of a GNSS system, and an indirect support operating mode in which asymmetry mitigation is traceable to an originating grandmaster device timescale.

9. The method of claim 1, further comprising combining time alignment determined using GNSS timing signals and time alignment determined using the timing packets to achieve robustness.

10. The method of claim 1, wherein the table storing asymmetry time error estimates is maintained for a single master or grandmaster device from which timing packets are received.

11. A clock device, comprising:
a memory configured to store a table which includes asymmetry time error estimates for one or more network paths, wherein each of the asymmetry time error estimates is obtained with global navigation satellite systems (GNSS) support; and
a processing unit programmed to correct a clock by performing steps comprising:
determining if the table includes an entry associated with a given network path,
if the table includes the entry associated with the given network path, correcting, based on an asymmetry time error estimate for the entry, a time delay estimated using timing packets received over the given network path, and
correcting the clock based on the corrected time delay estimate and time contained in the timing packets.

12. The device of claim 11, wherein the entry associated with the given network path is identified based on a corresponding signature determined from the received timing packets.

13. The device of claim 12, wherein the signature comprises a roundtrip delay estimate.

14. The device of claim 13, wherein identifying the entry associated with the given network path comprises:
determining if the table includes a candidate entry for a roundtrip delay window which matches the roundtrip delay estimated from the received timing packets; and
if the table includes the candidate entry, validating the candidate entry using hypothesis testing.

15. The device of claim 12, wherein the signature comprises transit delay estimates determined using the given network path with and without on-path support.

16. The device of claim 11, wherein each of the asymmetry time error estimates stored in the table is obtained by determining a difference between time error estimated using GNSS timing signals and time error estimated using timing packets transmitted over a respective network path.

17. The device of claim 16, wherein, for each asymmetry time error estimate, the time error difference is estimated in N non-overlapping time windows, and a clustering algorithm is applied using the time error differences in the N non-overlapping time windows to obtain the asymmetry time error estimate.

18. The device of claim 11, wherein the GNSS support is provided in one of a direct support operating mode in which asymmetry mitigation is directly traceable to Coordinated Universal Time (UTC) via time traceability of a GNSS system, and an indirect support operating mode in which asymmetry mitigation is traceable to an originating grandmaster device timescale.

19. The device of claim 11, the steps further comprising, combining time alignment determined using GNSS timing signals and time alignment determined using the timing packets to achieve robustness.

20. A method of correcting asymmetry for packet timing protocols in response to a path disruption, the method comprising:
calibrating asymmetry by determining, for a first network path, an asymmetry correction from one of (1) a difference between time error estimated using global navigation satellite systems (GNSS) timing signals and time error estimated using timing packets transmitted over the network path, and (2) a table storing previously determined asymmetry corrections for one or more network paths; and
correcting a clock based on a time delay which is estimated from time contained in the timing packets transmitted over the network path and corrected based on the asymmetry correction.

* * * * *